United States Patent [19]

Blevins et al.

[11] Patent Number: 5,019,635
[45] Date of Patent: May 28, 1991

[54] COPOLYMERS OF DIOXOLANES AND MALEIC ANHYDRIDE

[75] Inventors: Richard W. Blevins, Rochester; S. Richard Turner, Pittsford, both of N.Y.

[73] Assignee: Eastman Kodak Company, Rochester, N.Y.

[21] Appl. No.: 498,178

[22] Filed: Mar. 23, 1990

[51] Int. Cl.$^5$ ............................................. C08F 24/00
[52] U.S. Cl. ..................................... 526/266; 526/271
[58] Field of Search ................................ 526/266, 271

[56] References Cited

FOREIGN PATENT DOCUMENTS 1223015 2/1971 United Kingdom ................ 526/271

Primary Examiner—Joseph L. Schofer
Assistant Examiner—Alex Walker
Attorney, Agent, or Firm—Robert A. Linn

[57] ABSTRACT

Copolymers are made by reacting maleic anhydride or a related compound with a 4-vinyl-1,3-dioxolane in the presence of a free radical initiator. The dioxolane reactant can be made by reacting a ketone with 3,4-epoxy-1-butene, or a substituted derivative thereof.

8 Claims, No Drawings

COPOLYMERS OF DIOXOLANES AND MALEIC ANHYDRIDE

FIELD OF THE INVENTION

This invention relates to copolymers and to a method for their formation. The copolymers are made by reacting maleic anhydride with a 4-vinyl-1,3-dioxolane in the presence of a a free radical initiator.

BACKGROUND OF THE INVENTION

Reaction of dioxolanes with a maleic anhydride has not been described in the art. Hence, this invention provides new compositions and a method for their formation.

SUMMARY OF THE INVENTION

This invention relates to copolymers made from a 4-vinyl-1,3-dioxolane and maleic anhydride or a substituted derivative thereof. The copolymers are alternating, i.e. they have a structure characterized by the formula —A—D—A—D—A—D—, wherein A is a monomeric unit derived from the maleic anhydride reactant, and D is a monomeric unit derived from a 4-vinyl-1,3-dioxolane.

The 4-vinyl-1,3-dioxolanes used as reactants in this invention can be prepared by reacting a ketone with 3,4-epoxy-1-butene (EpB) or a substituted derivative thereof. The dioxolane can be employed in the reaction mixture in which it is produced, or isolated and then used in the process of this invention.

In the process of this invention, a maleic anhydride reactant is reacted with a 4-vinyl-1,3-dioxolane in a solvent, or neat, and in the presence of a free radical initiator. With regard to utility, the copolymer products of this invention are useful as chemical intermediates. The reactive anhydride groups in the products can be used to crosslink the copolymers with a variety of materials to produce useful coatings, films, binders, and dispersing agents for particulate materials. They can also be blended with other polymers to form coatings, films, pigment binders, etc.

DESCRIPTION OF THE PREFERRED EMBODIMENTS

In one embodiment, this invention comprises a copolymer having the alternating structure $$-A-D-A-D-A-D- \quad (I)$$

wherein A is a monomeric unit having the formula

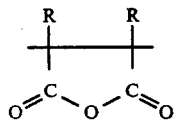
(II)

wherein each R is independently selected from the class consisting of hydrogen, halogen, the cyano group, and primary and secondary alkyl groups having up to about 40 carbon atoms, and D is a monomeric unit having the formula

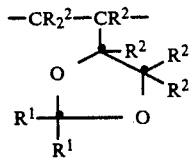
(III)

wherein each $R^1$ taken independently is an alkyl or aryl group having up to about 10 carbon atoms, or taken together are a divalent alkylene or arylene group having up to about 20 carbon atoms; each group indicated by $R^2$ is hydrogen or an alkyl group having one to about four carbon atoms such that the total of the number of carbon atoms in said $R^2$ groups, and the carbon atoms to which they are attached is up to about 8.

In another embodiment, this invention provides a process for preparing a copolymer, said process comprising reacting a maleic anhydride reactant having the formula:

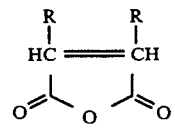

wherein each R is independently selected from the class consisting of hydrogen, halogen, the cyano group, and primary and secondary alkyl groups having up to about 4 carbon atoms, and (B) a dioxolane having the formula

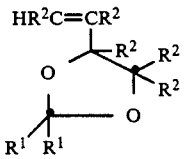

wherein each $R^1$ taken independently is an alkyl or aryl group having up to about 10 carbon atoms, or taken together are a divalent alkylene or arylene group having up to about 20 carbon atoms; each group indicated by $R^2$ is hydrogen or an alkyl group having one to about four carbon atoms such that the total of the number of carbon atoms in said $R^2$ groups, and the carbon atoms to which they are attached is up to about 8 said process being conducted in the presence of a free radical initiator.

As indicated above, this invention is related to copolymers and to a method for their formation. The method for preparing the products of this invention comprises reacting a maleic anhydride reactant, e.g. maleic anhydride itself or an analog or homolog thereof, with a dioxolane. The dioxolane can be prepared by reacting a butadiene monoepoxide with a ketone, using known methods e.g. F. G. Ponomarev, *Proc. of the Acad. of Sciences of the USSR*, Chem. Section, 108, 305 (1956). Thus for example, the dioxolane can be made by reacting a butadiene monoepoxide reactant having the basic structure:

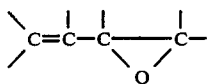

with a ketone having the formula:

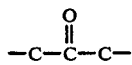

In formula IV and V above, the unsatisfied valences bind the carbon atoms from which they emanate to inert substituents, i.e. "inert groups". Such groups do not interfere with the formation of the dioxolane reactant. Furthermore, such substituents do not interfere with the process of this invention by decomposing to an undesired extent, under the reaction conditions employed to prepare the copolymer, or by undergoing one or more extraneous side reactions when exposed to said reaction conditions, or by unduly hindering the process of this invention by steric hindrance, or by interfering with the formation of free radicals needed to initiate and/or conduct the process, or by some other hindering action.

Some preferred substituents that are suitable for use in this invention have already been disclosed above when describing R, $R^1$ and $R^2$.

When a ketone is used to prepare a 4-vinyl-1,3-dioxolane reactant used in the process of this invention, it preferably has formula (VI).

In Formula (VI), each $R^1$ can be alike or different depending on whether the ketone is symmetrical or unsymmetrical. If the ketone is a cyclic ketone such as cyclohexanone, the $R^1$ groups will not be separate groups. Instead, they together will be a 1,1-cyclo group, e.g., 1,1-cyclohexylidene. The $R^1$ groups are derived from ketones having up to about 20 carbon atoms. Such compounds have the formula

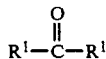

wherein each $R^1$ is alike or different. Preferably, $R^1$ is alkyl or aryl; more preferably, primary or secondary alkyl. It is most preferred that each $R^1$ be the same and selected from alkyl groups having up to about six carbon atoms. Straight chain alkyl groups of this type are highly preferred. In other preferred compounds, $R^1$ can be halosubstituted alkyl, more preferably perfluoromethyl. Preferred ketones are acetone, 2-butanone, hexafluoroacetone, cyclohexanone and the like. The 4-vinyl-1,3-dioxolanes can be prepared from such ketones by any method apparent to one skilled in the art. For example they may be prepared by reacting an excess of the ketone with a butadiene monoepoxide having the formula

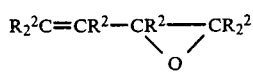

wherein $R^2$ is as described above.

Although the process of this invention can be conducted using one or more dioxolanes produced as previously described, it is to be understood that it is not necessary to do so. In other words, this invention is not limited by the way in which the dioxolane (or the maleic anhydride reactant) is made.

In a preferred embodiment, dioxolanes employed in the process of this invention have up to about thirteen carbon atoms. Although more heavily substituted 4-vinyl-1,3-dioxolanes can be used in the process of this invention, those having up to about 13 carbon atoms are preferred because they, in general, are more readily obtainable.

Maleic anhydride can be used as a reactant in the process of this invention. Substituted maleic anhydrides can also be used. When substituted, it is preferred that the maleic anhydride have up to about 12 carbon atoms. However, reactants which have more than 12 carbon atoms can be used, as long as the substituents are "inert" as defined above. Highly preferred inert substituents (other than hydrogen) are methyl, chloro, and cyano. By way of illustration, analogues or derivatives of maleic anhydride having the formulas:

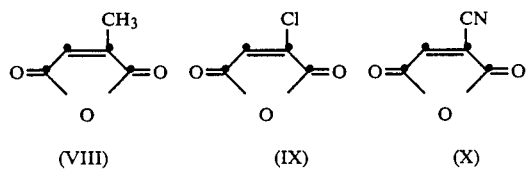

can be used in this invention.

Because the polymers of this invention have an alternating structure as described above, the monomers generally react in a mole ratio of 1 to 1. It is not necessary that the reactants be added to the reaction zone in this ratio; an excess of either reactant can be employed. There is no real upper limit on the amount of excess employed; this being defined by such secondary considerations as size of the reaction vessel, cost of the reactants, ease of separation of starting materials from products, etc. In general, one uses from about 0.5 to about 5.0 moles of one reactant per mole of the other. However, as discussed above it is to be understood that the composition of the polymer product is relatively insensitive to the ratio of reactants in the feed composition.

The process is conducted in the presence of a free radical initiator. In general, one employs a free radical initiator of the type known in the art such as azobisisobutyronitrile (AIBN), a benzoyl peroxide, hydrogen peroxide, butyl peroxide, and the like. The process can also be conducted in the presence of an amount of a redox initiator such as benzoyl peroxide and N,N-diethylaniline which is sufficient to initiate the reaction.

The amount of initiator employed is not critical. One employs enough initiator to achieve the desired result. Generally speaking, the amount of free radical initiator is from about 0.1 to about 10 weight percent based on the amount of dioxolane. More or less initiator can be used, if desired. A skilled practitioner can readily determine whether an amount of free radical (or redox) initiator is adequate by adding the amount of initiator under investigation and determining by experimentation whether initiation occurs as desired.

The process of this invention is conducted in the presence of a solvent. It is preferred that the solvent boil at or above the initiation temperature. Thus, when AIBN or a peroxide is used as an initiator, the solvent preferably has a boiling point of about 40° C. or higher; more preferably about 60° or above. When an ether is used as a solvent, one generally uses a monodentate, bidentate or tridentate either having up to about eight carbon atoms, and which has sufficient solvent power for the reactants and initiator, and which has a boiling point above the initiation temperature. For the purpose of this invention, ethers having one, two, or three ether linkages are designated respectively, monodentate, bidentate and tridentate ethers. Examples of such ethers are tetrahydrofuran, 1,4-dioxane, dimethoxyethane, diethyleneglycol dimethyl ether, and the like.

Ketones for use in this invention as solvent are preferably selected from ketones which have sufficient solvent power for the reactants and initiator, and also have a boiling point above the initiation temperature. Examples of suitable ketones are cyclic and acyclic ketones having three to about 20 carbon atoms such as acetone, 2-butanone, hexafluoroacetone, cyclohexanone and the like.

The concentration of reactants in the solvents is preferably in the 15-95 weight percent range; however it is to be understood that reactant concentrations somewhat outside this range can be used if desired. A preferred concentration of monomers range is usually from about 25-50 weight percent. It is to be recognized that a skilled practitioner may wish to operate outside the ranges given above. For example, an operator may wish to use no solvent or a minimum amount of solvent in order to improve process economics. Hence, the above ranges are not critical.

The process is started and conducted at convenient reaction temperatures which provide initiation of the reaction and a reasonable reaction rate. More than one temperature can be used. Thus, for example, the process can be initiated at one temperature and conducted at another temperature, or at several temperatures. In general, when free radical initiation is employed, the process is initiated and conducted at temperatures between about $-10°$ C. to about $180°$ C.

All of the materials used can be admixed prior to reaction. Alternatively, one may use a programmed addition of one or more materials to the reaction mass.

The process proceeds well at ambient pressure. Thus, use of atmospheric pressure is preferred. However, subatmospheric and superatmospheric pressures can be used if desired. Superatmospheric pressures may be preferably selected when a high temperature initiator is employed, or one or both of the reactants boil at a temperature below the selected reaction temperature.

The reaction time is not a truly independent variable, but is dependent at least to some extent on the inherent reactivity of the reactants, the half life of the initiator, the reaction temperature employed, the conversion rate desired, etc. In general, process times in the range of from about 1 to about 36 hours. Times within the range of from about 4 to about 24 hours are preferred.

The molecular weight of the products of this invention is influenced somewhat by the molecular weight of the starting monomers. Thus for example the molecular weight of the product polymer will increase when the molecular weight of the monomers increase, unless the presence of substituent groups on the monomer lowers the degree of polymerization in some manner. In general the number average molecular weight is in the range of from about 500 to about 20,000. Polymeric or oligomeric products with a molecular weight range somewhat outside of this range are within the scope of the invention.

EXAMPLE 1

In a dry glove box under an inert atmosphere, 2-ethyl-2-methyl-4-vinyl-1,3-dioxolane 1.42 g, 10 mmol; and maleic anhydride, 0.98 g, 10 mmol; were combined with 3.6 g of dry 2-butanone in a Claisen bottle having a magnetic stirrer, and then sealed. The resultant mixture was heated at $70°$ C. with stirring for 20 hours.

The product solution was diluted with 5 g tetrahydrofuran (THF) and precipitated into 200 ml heptane. The product was filtered, redissolved in dry THF, and reprecipitated into ethyl ether, filtered, and dried to obtain a slightly yellow powder. The NMR spectrum was consistent with an alternating polymer of maleic anhydride and the dioxolane. There were no remaining vinyl protons and the ethyl and methyl resonances from the enchained dioxolane were clearly discernible.

Yield = 1.68 g (70% theory).

EXAMPLE 2

The procedure of Example 1 was followed, substituting 1.38 g of 2,2-dimethyl-4-vinyl-1,3-dioxolane for 2-ethyl-2-methyl-4-vinyl-1,3-dioxolane. NMR shows no vinyl protons and is consistent with a 1,2-propagation of the dioxolane monomer.

Yield = 0.84 g, 36% theory. Size exclusion chromatography (SEC) in THF, $\overline{Mn} = 1790$, $\overline{Mw} = 2800$, $\overline{Mn}/\overline{Mw}$ 1.56.

EXAMPLE 3

In a dry box under argon a Claisen bottle was filled with 0.71 g (5 mmol) of 2-ethyl-2-methyl-4-vinyldioxolane, 0.49 g (5 mmol) maleic anhydride, 0.017 g AIBN (2% molar to dioxolane) and a magnetic stir bag. The reaction bottle was crimp-sealed, and placed in an oil bath at $70°$ C. with stirring for 24 hours. The reacted solid was dissolved with 10 ml dry THF, and precipitated into rapidly stirred heptane. The solid polymer (oligomer) was redissolved in dry THF, reprecipitated into ethyl ether (to remove any unreacted MAn) and collected using suction filtration.

Yield was 1.13 g (94% theory). $\overline{Mn} = 1340$, $\overline{Mw} = 2600$, $\overline{Mw}/\overline{Mn} = 1.94$.

EXAMPLE 4

A Claisen bottle was filled with 0.71 g (5 mmol) of 2-ethyl-2-methyl-4-vinyldioxolane, 2.4 g toluene (33% by weight monomers/solvent) 0.49 g (5 mmol) maleic anhydride, 0.017 g AIBN (2% molar to dioxolane and a magnetic stir bar. The reaction bottle was crimp-sealed, and placed in an oil bath at $70°$ C. with stirring for 24 hours. Solid polymer precipitated out of solution and coated the walls of the reaction bottle. The polymer solution was dissolved with 5 ml dry THF, and precipitated into rapidly stirred heptane. The solid polymer (oligomer) was redissolved in dry THF, reprecipitated into ethyl ether (to remove any unreacted MAn) and collected using suction filtration.

Yield was 0.56 g (47% theory). $\overline{Mn} = 1330$, $\overline{Mw} = 2240$, $\overline{Mw}/\overline{Mn} = 1.68$.

EXAMPLE 5

A reaction similar to that described in Example 4 was run substituting 1,2d-chloroethane for toluene. The polymer remained in solution, was diluted with dry THF, and precipitated to obtain 0.60 g (50% theory) of solid polymer.

Proton NMR Spectra (in deuterated dioxane) of the polymers obtained from Examples 3-5 were substantially the same.

The invention has been described in detail above with particular reference to preferred embodiments thereof. A skilled practitioner, familiar with the above detailed description can make many changes and substitutions without departing from the scope and spirit of the appended claims.

We claim:

1. A copolymer having the alternating structure $$-A-D-A-D-A-D- \quad (I)$$

wherein A is a monomeric unit having the formula

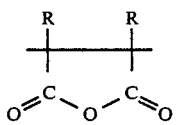
(II)

wherein each R is independently selected from the class consisting of hydrogen, halogen, the cyano group, and primary and secondary alkyl groups having up to about 4 carbon atoms, and D is a monomeric unit having the formula

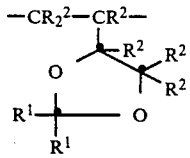
(III)

wherein each $R^1$ taken independently is an alkyl or aryl group having up to about 10 carbon atoms, or taken together are a divalent alkylene or arylene group having up to about 20 carbon atoms; each group indicated by $R^2$ is hydrogen or an alkyl group having one to about four carbon atoms such that the total of the number of carbon atoms in said $R^2$ groups, and the carbon atoms to which they are attached is up to about 8.

2. The copolymer of claim 1 wherein each R is H.

3. The copolymer of claim 1 wherein each $R^1$ is a primary or secondary alkyl group having up to about 10 carbon atoms.

4. The copolymer of claim 1 wherein each $R^2$ is selected from methyl and ethyl.

5. The copolymer of claim 2 wherein each $R^2$ is selected from methyl and ethyl.

6. The copolymer of claim 5 wherein each $R^2$ is methyl.

7. The copolymer of claim 5 wherein one $R^2$ group is methyl and the other is ethyl.

8. The copolymer of claim 1 having a molecular weight of from about 500 to about 20,000.

* * * * *